(12) United States Patent
Richter

(10) Patent No.: US 7,868,746 B2
(45) Date of Patent: Jan. 11, 2011

(54) ELECTRICAL CIRCUIT

(75) Inventor: Wolfgang Richter, Germering (DE)

(73) Assignee: Ident Technology AG, Wessling (DE)

( * ) Notice: Subject to any disclaimer, the term of this patent is extended or adjusted under 35 U.S.C. 154(b) by 0 days.

(21) Appl. No.: 11/831,067

(22) Filed: Jul. 31, 2007

(65) Prior Publication Data

US 2008/0024312 A1 Jan. 31, 2008

Related U.S. Application Data

(63) Continuation of application No. PCT/EP2006/000824, filed on Jan. 31, 2006.

(30) Foreign Application Priority Data

Jan. 31, 2005 (DE) .................. 20 2005 001 566

(51) Int. Cl.
*B60R 25/10* (2006.01)
(52) U.S. Cl. ................ 340/426.28; 340/5.62; 340/5.72; 340/573.1; 340/825.39; 340/5.2; 307/10.1; 307/116; 307/117; 324/661; 361/287
(58) Field of Classification Search ............ 340/426.26, 340/5.2, 5.7, 5.61, 5.72, 561, 562, 565, 505, 340/567, 825.36, 825.37, 825.39, 686.6, 340/426.28, 5.62; 307/10.1–10.5, 116, 686.6, 307/117; 324/661; 361/287
See application file for complete search history.

(56) References Cited

U.S. PATENT DOCUMENTS 4,758,735 A * 7/1988 Ingraham .................... 307/116

(Continued)

FOREIGN PATENT DOCUMENTS

DE 102 34 231 2/2004

(Continued)

OTHER PUBLICATIONS

International Search Report dated Apr. 3, 2006, from the corresponding International Application.

*Primary Examiner*—George A Bugg
*Assistant Examiner*—Sisay Yacob
(74) *Attorney, Agent, or Firm*—Katten Muchin Rosenman LLP

(57) ABSTRACT

The invention relates to an electric circuit arrangement for generating or receiving an output signal or switched condition definitive for the effective locking condition of a door system, especially a motor vehicle door system. The object of the invention is to provide a circuit arrangement with which an output signal definitive for the locking condition of a door system can be furnished, the generation of which signal takes the intentions of a user or the instantaneous situation into account in improved manner. This object is inventively achieved according to a first aspect of the present invention by an electrical circuit arrangement for generating an output signal or switched condition definitive for the sequence for determination of the locking condition of a door system, wherein
this circuit arrangement comprises door-mounted system components that as such include door-mounted means for sensing electrical interactions in conjunction with an action, especially movement of a user in the zone around the door system, especially in the zone of approach to a door handle, and
the circuit arrangement is designed such that it analyzes such changes of those interactions with regard to certain time-dependent signal-change patterns, and the circumstance of whether certain time-dependent signal patterns exist in the further electronic signal processing is taken into consideration for determining the locking condition.

22 Claims, 2 Drawing Sheets

U.S. PATENT DOCUMENTS

| | | | |
|---|---|---|---|
| 6,366,204 B1 * | 4/2002 | Zannier | 340/561 |
| 6,774,789 B2 * | 8/2004 | Inaba et al. | 340/541 |
| 6,873,200 B2 * | 3/2005 | Evers et al. | 327/365 |
| 7,071,812 B2 * | 7/2006 | Mafune et al. | 340/5.7 |
| 7,205,777 B2 | 4/2007 | Schulz et al. | |
| 2002/0030594 A1 * | 3/2002 | Inaba et al. | 340/562 |
| 2004/0183651 A1 * | 9/2004 | Mafune et al. | 340/5.7 |
| 2005/0024122 A1 * | 2/2005 | Evers et al. | 327/427 |
| 2005/0068712 A1 * | 3/2005 | Schulz et al. | 361/287 |

FOREIGN PATENT DOCUMENTS

| | | |
|---|---|---|
| DE | 103 05 342 | 9/2004 |
| EP | 1 187 075 | 3/2002 |
| EP | 1 505 734 | 2/2005 |
| FR | 2 785 703 | 5/2000 |
| WO | 2004/078536 | 9/2004 |

\* cited by examiner

ELECTRICAL CIRCUIT

CROSS-REFERENCE TO RELATED APPLICATIONS

This application claims priority to International Application PCT/EP/2006/000824, which was filed Jan. 31, 2006. This application claims priority to German Application 20 2005 0001 0566.0 filed on Jan. 31, 2005.

BACKGROUND OF THE INVENTION

1. Field of the Invention

The invention relates to an electric circuit arrangement for generating or receiving an output signal or switched condition definitive for the effective locking condition of a door system, especially a motor vehicle door system. In particular, the invention relates to a circuit arrangement for generating an output signal on the basis of a signal-processing system designed to sense features typical of intention.

2. Description of the Related Art

It is known that motor vehicles can be equipped with circuit arrangements by which the locking condition of the motor vehicle doors can be determined on the basis of electronic processing of key signals. These signals can be furnished on the basis of electromagnetic (including optical), acoustic or even electric-field interaction effects, and in this respect can be emitted by a circuit to be worn or carried by a user.

In particular, there are known door systems in which the signals definitive for the determination of the locking condition are coupled into components of the door system, especially of the door handle, upon contact with these components, and hereby they become available for further evaluation. Such systems make it possible, for example, to open a door without the need, for this purpose, to actively operate a remote control, especially a radio key. Nevertheless, problems can occur in systems configured in this way, because under certain circumstances the locking condition is changed during corresponding approach of an authorized user to the door system, even though this has apparently not been requested, desired or permitted by that user. Furthermore, the problem exists that manipulation-proof signal-processing sequences as well as the activation of mechatronic systems such as opening mechanisms and actuators in motor vehicle doors may cause delays in changing the locking condition and thus lead to loss of convenience.

SUMMARY OF THE INVENTION

Against the foregoing background, the object of the invention is to provide a circuit arrangement with which an output signal definitive for the locking condition of a door system can be furnished, the generation of which signal takes the intentions of a user or the instantaneous situation into account in improved manner.

This object is inventively achieved according to a first aspect of the present invention by an electrical circuit arrangement for generating an output signal or switched condition definitive for the sequence for determination of the locking condition of a door system, wherein this circuit arrangement comprises door-mounted system components that as such include door-mounted means for sensing electrical interactions in conjunction with an action, especially movement of a user in the zone around the door system, especially in the zone of approach to a door handle, and the circuit arrangement is designed such that it analyzes such changes of those interactions with regard to certain time-dependent signal-change patterns, and the circumstance of whether certain time-dependent signal patterns exist in the further electronic signal processing is taken into consideration for determining the locking condition.

Hereby it is advantageously possible to establish whether the user's behavior is typical of the intention to change the locking condition.

Preferably the circuit arrangement is configured such that the time-dependent signal-change pattern reflects a change of the electric field characteristics of the zone surrounding a door handle device.

The circuit can be constructed in such a way that the electric field characteristics are sensed by the frequency change of an oscillating circuit, into which the door handle device is integrated and in which the ambient conditions of the door handle device, especially as a dielectric, are significant for frequency.

Furthermore, the circuit is advantageously created such that, if at least one pattern criterion of the time-dependent signal-change pattern is met, a wake-up signal is generated by the door-mounted system components in order to activate a key circuit being worn or carried by the user.

In connection with sensing the signal-change pattern, dialog timing can take place with a key circuit to be worn or carried by the user and determining proof of authorization, so that a certain signal transfer is processed during a preliminary procedure and a signal transfer that ultimately governs the change of locking condition takes place during a second dialog phase initiated by the signal-change pattern. During the preliminary procedure, an extensive dialog for proof of authorization can then take place between the door-mounted system and the user's system, whereas final matching of the information content of a signal furnished from the user's side with control information provided by the door-mounted system takes place during the second dialog phase.

As an alternative to the last measure, it is also possible, during the second dialog phase, for a release decision to be made merely on the basis of a determination as to whether contact or a definite imminent grasping condition exists.

According to a second inventive solution, the object specified hereinabove is also achieved by a circuit arrangement for generating an output signal or switching condition definitive for the locking condition of a door system, wherein this circuit arrangement comprises door-mounted system components and system components of the user, the door-mounted components include means for sensing signal events furnished by the user circuit, and the circuit arrangement is designed in such a way that it senses changes of characteristics of the signals furnished on the user's side on the basis of movements of the user, and furthermore the circuit arrangement is configured in such a way that it determines, by those sensed changes, whether these satisfy criteria definitive for changing the locking condition.

Preferably the time-dependent intensity variation of the signal intensity is taken into consideration. This can be achieved by the fact that the time-dependent intensity variation must meet certain intensity pattern criteria.

The signals can be furnished by the circuit arrangement to be worn or carried by the user on the basis of electric field interaction effects. Preferably the signals from the circuit to be worn or carried by the user are transmitted only following a wake-up event. The wake-up event can be picked up via a high-impedance signal input in the user's circuit device without the need for power-wasting pre-activation of the user's circuit.

In the presence of a signal event sensed by the user's circuit device as a permissible wake-up signal, the user's circuit device can change to a condition in which it generates a signal event suitable for proof of authorization. That wake-up event is preferably generated by an electrode device provided in the door system.

The wake-up event can be generated by the door system, as a signal event having information content (FSK, ASK, etc.) that can be sensed by the circuit device to be worn or carried by the user. The corresponding response signal can also be generated in such a way that it contains relatively dense information content.

On the basis of the inventive solution, it is possible to detect whether a clear opening intent already exists before contact with a door handle equipped with the invention. In addition, the functional capability of the system can be tested and ensured in simple manner. The invention is effective with merely the mechanical components provided in standard door handles, and in particular functions in door handles of metal and plastic or wood. In door handles of nonconductive materials, a wire or other conductor can be mounted with little effort.

Conductive paint coats or gels and other conductive liquids can also be used as the sensor input element. Moreover, the sensor input element (such as a wire) can also be used for coupling identified signals that may be injected via alternating fields (capacitive or electromagnetic). Thereby it is also possible to construct an authorization element, in order to distinguish authorized from unauthorized users (such as intruders).

DESCRIPTION OF THE DRAWING

Further details and features of the invention will become clear from the description hereinafter in conjunction with the drawing, wherein.

DETAILED DESCRIPTION OF THE INVENTION

Figure 1:
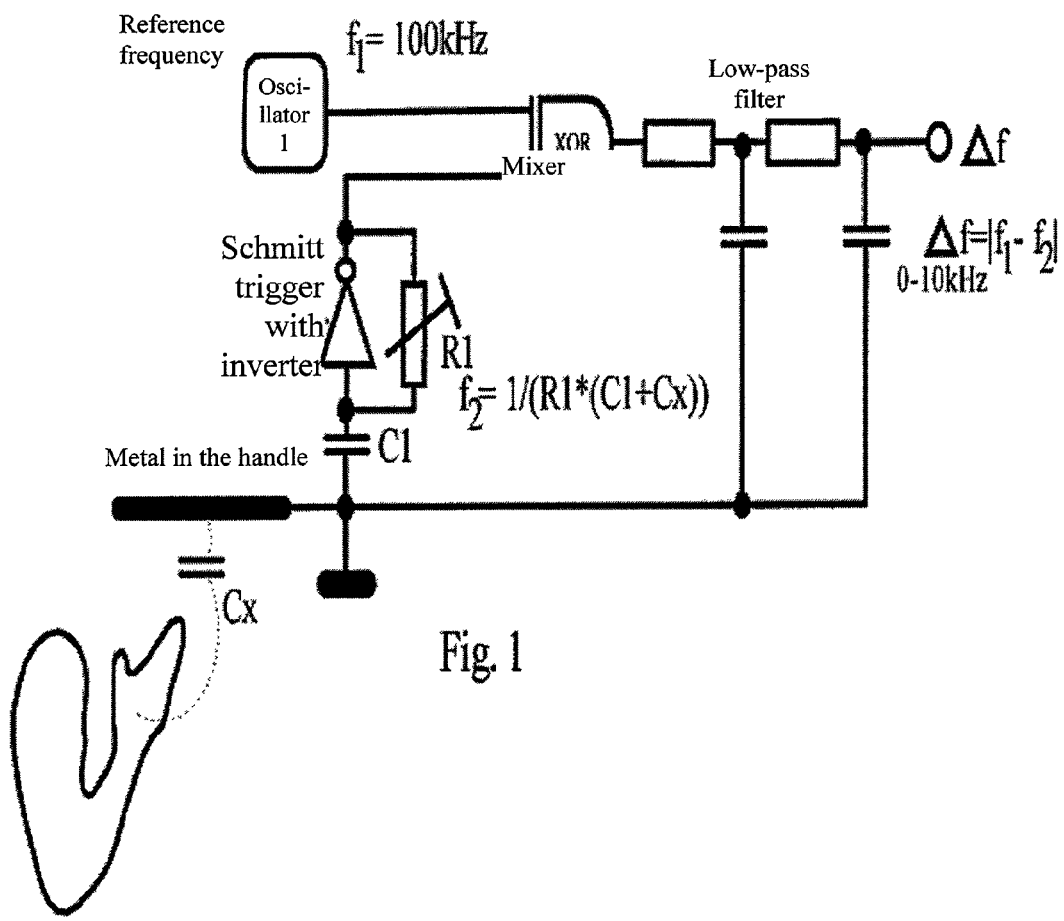
FIG. 1 shows a first example of a circuit arrangement.

Explanations of the Circuit Construction, Especially in Conjunction with FIG. 1

A stable oscillator delivers a square-wave signal at 100 kHz, for example, to a digital output. This signal (f1) is routed to an input of an exclusive OR (XOR). A second oscillator is constructed wherein the frequency-determining element comprises a resistor and a small capacitor (approximately 1 pF). The output of this oscillator should also be digital and be routed to the second input of the XOR (f2). Oscillator 2 may be configured as a Schmitt Trigger with an inverter.

To the output of the exclusive OR there is connected a low-pass filter with a pass band such as approximately 10 kHz (0 to 10 kHz). Capacitor C1 of the second oscillator is connected at one end to ground and at the other end to frequency-determining resistor R1. The sensor element of the handle is also connected to this point. If an additional capacitance such as a human hand enters the neighborhood of this sensor, the total capacitance of oscillator 2 increases and its frequency becomes lower.

Figure 2:
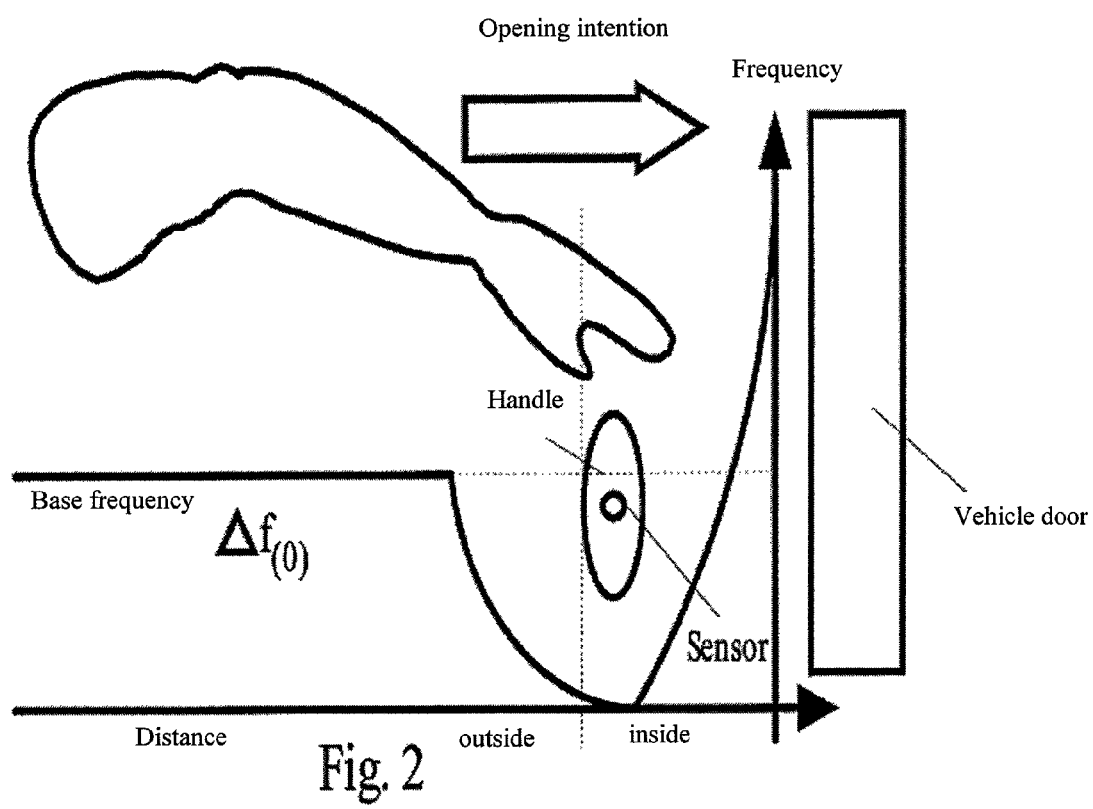
FIG. 2 shows a function diagram

Explanations of the Basic Mode of Operation, Especially in Conjunction with FIG. 2

Oscillator 2 is adjusted to 101 kHz, so that a resultant low frequency of 1 kHz produced by beating can be measured at the output of the low-pass filter disposed downstream from the XOR.

If a hand approaches the sensor element, an additional capacitance Cx is developed, causing the frequency of oscillator 2 to drop. If this reaches 100 kHz, the difference relative to oscillator 1 is equal to zero and can also be picked up at the low-pass filter as the zero level. This point should be adjusted such that it occurs precisely when the hand is close enough to the handle to surround it. If the handle is now further surrounded, the capacitance of oscillator 2 increases in turn, and so frequency f2 is lower than that of stable oscillator 1, for example being 98 kHz. As a result, a frequency change from zero to 2 kHz can be observed at the output of the low-pass filter.

In summary, it can be said that the approach of a hand to a handle first generates a beat frequency from 1 kHz to zero and then from zero to greater than 2 kHz. Only when a connected logic unit recognizes such a frequency change can a definite opening intention be detected. If the handle is touched, frequency f2 changes so much due to the now high capacitance Cx of oscillator 2 that a very high beat frequency is generated. Thus the sensor element can distinguish reliably and in simple manner between the situations in which a handle is being approached, surrounded and touched.

The fact that the frequency of oscillator 2 is increased slightly from its initial value (for example by 1 kHz in the present case) can be used on the one hand to detect (monitor) the correct mode of operation of the sensor constantly, while on the other hand a drift due to ambient factors (temperature, relative humidity, etc.) can be compensated by providing a regulating circuit that always corrects the frequency in the event of a small deviation.

Plausibility Example

The circuit according to FIG. 1 is connected to a metal door handle. A hand is moved into the proximity of the door handle in a manner suggesting an intent to surround it.

The output frequency at the low-pass filter is now set to zero with R1. After the hand has been withdrawn, the basic frequency at the output of the low-pass filter can be measured. If the hand is now moved once again toward the handle, this frequency drops to zero and then increases again if the handle is surrounded. On the basis of the time-dependent frequency change typical of the approach of a hand, an opening intent can be recognized before the door handle is actually touched.

The invention claimed is:
1. An electrical circuit for generating an output signal for indicating if a door of a door system is locked, the circuit comprising:
 a door-side component for detecting an electrical change;
 means for analyzing the electrical change as a predetermined temporal signal modification pattern, the means for analyzing the electrical change comprising a Schmitt trigger;
 means for signal processing using the temporal signal modification pattern to generate the output signal;

a key circuit associated with a user, the key circuit being placed in an operative condition by the output signal to authenticate the key circuit;

a logic unit interpreting a user attempt to open the door system when the temporal signal modification pattern comprises a beat frequency of 1 kHz becoming zero kHz and from zero kHz becoming at least 2 kHz.

2. The circuit of claim 1 wherein the electrical change is a result of a movement of a user proximate a handle of the door.

3. The circuit of claim 1 wherein the electrical change is a distortion of the electric field in a proximate region to a handle of the door.

4. The circuit of claim 3 wherein the distortion is detected as a frequency change in a resonant circuit in which the handle of the door and the proximate region to the handle of the door are connected.

5. The circuit of claim 1 wherein when the temporal signal modification pattern matches a criterion, the output signal comprises an activation signal for activating a lock assembly.

6. The circuit of claim 5 further comprising means for an authorization process using the activation signal to unlock the door.

7. The circuit of claim 6 wherein the authorization process comprises a signal dialog between the door-side component and the means for an authorization process.

8. An electrical circuit for generating a signal for determining an operating status of a door system, the circuit comprising:

a user-side component for generating a signal and detecting movement, the signal being changed in response the detection of movement;

a door-side component for processing the signal to determine if a change in the signal matches a predetermined temporal criterion to change the operating status of the door system to one of locked or unlocked, the door side component comprising a Schmitt trigger;

a logic unit interpreting a user attempt to open the door system when the temporal signal modification pattern comprises a beat frequency of 1 kHz becoming zero kHz and from zero kHz becoming at least 2 kHz.

9. The circuit of claim 8 wherein the door-side component determines an intensity of the change in the signal.

10. The circuit of claim 9 wherein the door-side component determines a change of the intensity over time.

11. The circuit of claim 8 wherein the change in the signal is related to a distortion in the electric field proximate the user-side component.

12. The circuit of claim 8, wherein the change in the signal comprises an activation signal.

13. The circuit of claim 12, wherein the activation signal comprises a high impedance signal.

14. The circuit of claim 12 further comprising a means for authorization process for authorizing a change in the operating status based on the change in the signal.

15. The circuit of claim 12 wherein the door-side components comprise an electrode assembly for generating the activation signal.

16. A circuit for a door, the circuit comprising:

a sensor for detecting a field electric change proximate to a handle of the door;

a signal processing means for changing an operating status of the door to one of locked or unlocked; and means for signal processing using a temporal signal modification pattern to generate an output signal that authenticates a circuit associated with a user, the means for signal processing comprising a Schmitt trigger;

a logic unit interpreting a user attempt to open the door when the temporal signal modification pattern comprises a beat frequency of 1 kHz becoming zero kHz and from zero kHz becoming at least 2 kHz.

17. The electrical circuit of claim 1, further comprising an oscillator for generating the beat frequency and an XOR mixer, the mixer being operative with the oscillator and the Schmitt trigger, wherein the beat frequency is 1 kHz at the oscillator and is at least 2 kKz at the Schmitt trigger when the user makes the attempt to open the door.

18. The electrical circuit of claim 8, further comprising an oscillator for generating the beat frequency and an XOR mixer, the mixer being operative with the oscillator and the Schmitt trigger, wherein the beat frequency is 1 kHz at the oscillator and is at least 2 kKz at the Schmitt trigger when the user makes the attempt to open the door.

19. The circuit of claim 16, further comprising an oscillator for generating the beat frequency and an XOR mixer, the mixer being operative with the oscillator and the Schmitt trigger, wherein the beat frequency is 1 kHz at the oscillator and is at least 2 kKz at the Schmitt trigger when the user makes the attempt to open the door.

20. The electrical circuit of claim 1, wherein the means for signal processing in a first dialog phase generates the output signal and in a second dialog phase determines whether to unlock the door based on a user's hand position matching the temporal signal modification.

21. The electrical circuit of claim 8, wherein the door-side component in a first dialog phase generates the output signal and in a second dialog phase determines whether to unlock the door based on a user's hand position matching the temporal signal criterion.

22. The electrical circuit of claim 16, wherein the means for signal processing in a first dialog phase generates the output signal and in a second dialog phase determines whether to unlock the door based on a user's hand position matching the temporal signal modification.

* * * * *